Feb. 18, 1936. E. CULVER ET AL 2,030,968
EYEGLASS LENS
Filed Oct. 9, 1934
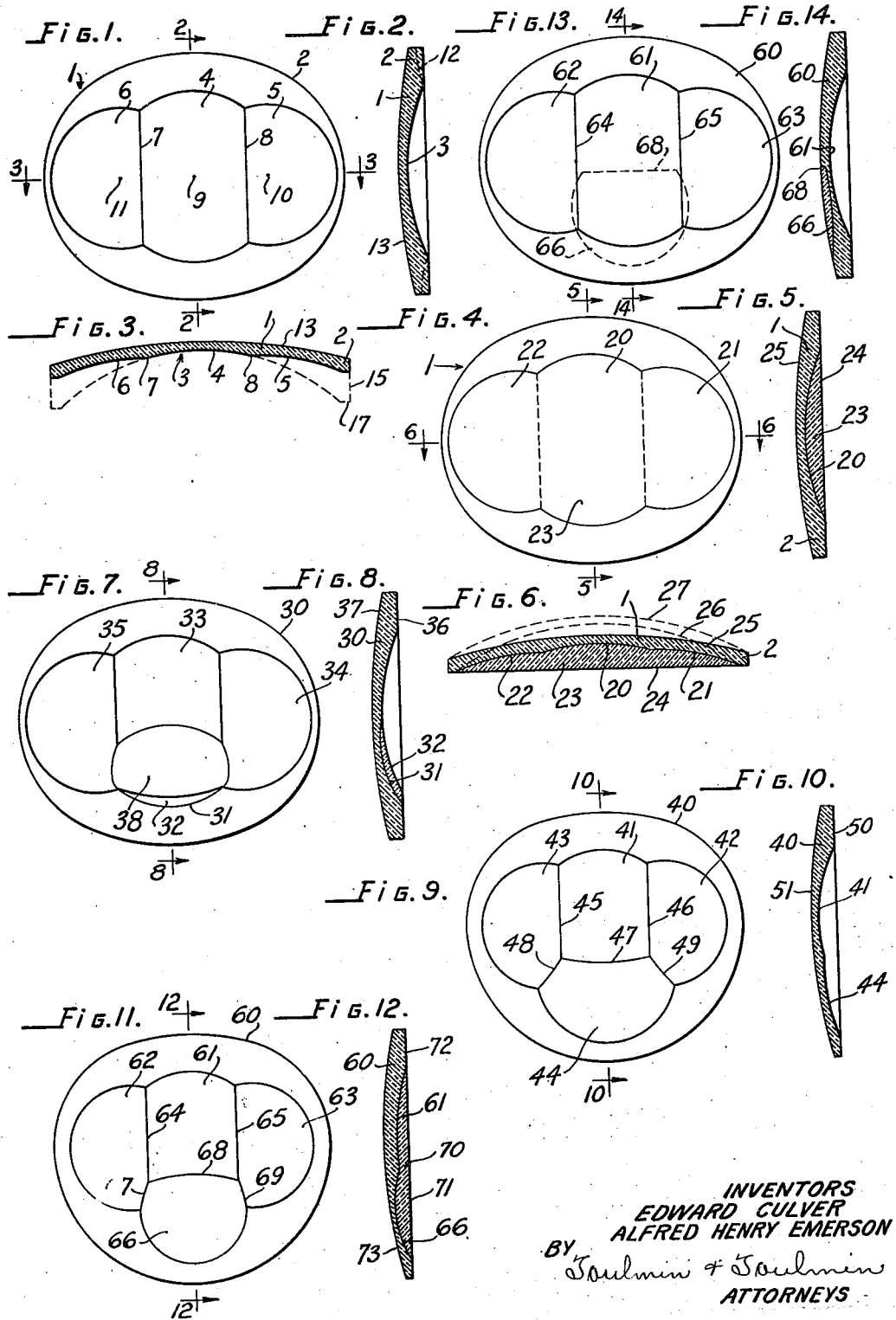
INVENTORS
EDWARD CULVER
ALFRED HENRY EMERSON
BY Toulmin & Toulmin
ATTORNEYS Patented Feb. 18, 1936

2,030,968

UNITED STATES PATENT OFFICE 2,030,968

EYEGLASS LENS

Edward Culver and Alfred Henry Emerson, London, England, assignors to United Kingdom Optical Company, Limited, London, England Application October 9, 1934, Serial No. 747,576
In Great Britain June 27, 1934

9 Claims. (Cl. 88—54)

This invention relates to eyeglass lenses, generally known as ophthalmic lenses, and especially to lenticular ophthalmic lenses wherein the thickness of high-powered lenses is reduced by the provision of a small diameter lens portion surrounded by a non-visual portion known as the carrying border.

One object of our invention is to provide a lenticular ophthalmic lens having multiple fields of the same power, so as to still further reduce the thickness required for a high-powered concave or convex lens as compared to the thickness required for an ordinary lenticular lens.

Another object is to provide a lenticular ophthalmic lens having a central field and other fields of the same power adjacent to the central field, thereby forming a plurality of visual fields whose size overall is much elongated in one direction.

Another object is to provide a lenticular ophthalmic lens having a plurality of visual fields arranged adjacent to one another horizontally, these fields being of the same power and enabling the wearer to obtain a wide angle of view in a horizontal direction without requiring the angle of view in the vertical direction to be unnecessarily increased.

Another object is to provide a bifocal lenticular lens having fields of the above description together with a field of different power, so as to adapt it for both distant and near vision, this bifocal being either of a one-piece or fused construction.

Another object is to provide a lenticular ophthalmic lens having a plurality of fields of the same visual powers but with differently-located ophthalmic centers, and surrounded by a non-visual portion.

Another object is to provide a method of making a lenticular concave lens consisting of preparing a border portion and grinding therein a plurality of lenticular depressions of the same surface powers and intersecting one another.

Another object is to provide a method of making a lenticular convex lens consisting of preparing a carrying border, surfacing therein a plurality of concave intersecting portions having the same surface curvature, preparing a button adapted to be fused into the multiple depression thus made, and fusing the button into the depression. There can be an individual fusing operation after each depression is made.

This invention is for the purpose of providing an improved lens for the correction of strong myopic and hyperopic errors of refraction. It is well known that many of the lenses at present in use for the correction of these high errors are very thick, heavy, ugly in appearance and often, owing to the curvatures employed give poor vision except at the very centre of the lens. It is the purpose of this invention to reduce the weight and to improve the appearance and optical performance of these high power lenses.

One method of obtaining some reduction in the weight of these lenses which is at present in use is to make them in lenticular form. This is done by removing glass from the peripheral portions of the lens by grinding a different curve on the margin of the lens from that at the center. This has the effect of cutting down the field of view and any great saving in weight can only be obtained by still further reducing the field. Further, at the edge of the field of these lenses considerable aberrations occur and there is a large deviation of the line of sight on passing through the lens. This deviation or prismatic effect is outwards with concave lenses and inwards with convex and increases as the line of sight moves away from the optical center of the lens.

Now in ordinary everyday vision the excursions of the eye from its position of rest are greatest and most frequent in the horizontal meridian. This invention provides lenses which are lighter in weight and which also have a wider horizontal field of view with less prismatic effect than those at present in use.

This is accomplished by dividing the horizontal field into three or more portions each with its own optical center.

In the drawing:

Figure 1 is an elevational view of a single power lenticular concave lens according to my invention;

Figure 2 is a central vertical section along the line 2—2 of Figure 1;

Figure 3 is a central horizontal section along the line 3—3 of Figure 1, the dotted lines showing the thickness required for the lens if a single lenticular portion were used instead of the multiple lenticular portions provided by my invention;

Figure 4 is an elevational view of a single-power convex lenticular lens according to my invention;

Figure 5 is a central vertical section along the line 5—5 of Figure 4;

Figure 6 is a central horizontal section along the line 6—6 of Figure 4, the dotted lines showing the thickness which would be required for the lens if a single lenticular portion were used instead of the multiple lenticular portions of my invention;

Figure 7 is an elevational view of a lenticular concave bifocal made of two kinds of glass fused together;

Figure 8 is a central vertical section along the line 8—8 of Figure 7;

Figure 9 is an elevational view of a lenticular concave bifocal lens made from the same kind of glass throughout, but having different surface curvatures to provide the differently-powered reading portion;

Figure 10 is a central vertical section along the line 10—10 of Figure 9;

Figure 11 is an elevational view of a lenticular convex bifocal lens according to my invention;

Figure 12 is a central vertical section along the line 12—12 of Figure 11.

Figure 13 is an elevation of a modified form of lens with an insert on the side opposite the ground surface having a plurality of ground depressions.

Figure 14 is a section on the line 14—14 of Figure 13.

Referring to the drawing in detail, Figure 1 shows a lenticular concave lens according to our invention as consisting of a body portion, generally designated 1, and divided into a border portion 2 and a visual portion 3. The border portion 2 is not used for vision, but is provided merely as a carrying portion to contain the visual portion 3.

The visual portion 3 consists of a plurality of areas 4, 5 and 6 arranged adjacent to one another and having the same surface curvatures. In this manner the dividing lines 7 and 8 between these adjacent portions are straight when viewed by an observer directly in front of the lens. The reason for this straightness depends on the geometric fact that two spherical surfaces of the same radii of curvature intersect along an arc whose projection on a plane parallel to their line of centers is a straight line. The intersecting fields 4, 5 and 6, therefore, have independent optical centers 9, 10 and 11 spaced apart from one another.

To make the lenticular concave lens shown in Figure 1, a blank of glass sufficient in size to make the body portion 1 is ground and polished with a tool of the proper curvature to make the concavity comprising the central portion 4. The lens and tool may then be shifted relatively to one another and the side portions 5 and 6 similarly ground and polished. The border portion 2 may be provided with a border surface 12 of curvature appropriate to give a thin edge to the lens when the outer surface 13 common to all fields has been ground and polished. It is not intended to imply that it is necessary to start by grinding the concavity 4. Any other method may be adopted which produces the three fields 4, 5 and 6 in the positions shown.

In this manner, there results a lenticular concave lens with multiple fields adjoining one another. The provision of these multiple fields enables the reduction of the edge thickness of the lens by a considerable amount. The great reduction possible by our invention is shown in Figure 3, wherein the dotted lines represent the cross sectional dimensions of an ordinary lenticular concave lens of the same power, but having only a single lenticular area. The dotted edge 15 is of such thickness as to make such a lens unsightly; consequently it has been the practice hitherto to make the lenticular portion of small dimensions in order to keep this edge thickness 15 at a minimum. By my invention, however, the lenticular area may be given a very wide extent, yet the edge thickness may be kept within limits smaller than those of a single lenticular lens with a much smaller lenticular area. It will be seen, furthermore, that if the dotted border portion 17 is omitted (Figure 3) and the lenticular surface be carried directly out to meet the edge 15, then the latter will be still thicker and still more unsightly; this would occur in an ordinary single-vision lens without any lenticular area whatever.

Thus by the provision of the multiple lenticular areas arranged side by side, I not only provide a lens which is attractive in appearance, but also conforms to the mechanical action of the eyes. It has been found by experimentation and observation over a large number of cases that human beings use their eyes to a much greater extent in horizontal directions than in vertical ones. Consequently, the eyeballs are rotated through a much wider angle of view horizontally than vertically. As a result the ideal lenticular lens should have a horizontal field which is much broader than the vertical field, thus consisting in its ideal form of an elongated area. Such an area is provided by the lens of my invention, and without the excessive thickness which the "oval lenticular" lens of the prior art occasioned. In the latter form of lens, the edge thickness was largely determined by the greater horizontal diameter of the lens than the vertical diameter, the border portion of the lens having been "convexed" with a tool having a toric surface so as to give an oval outline to the central lenticular area.

To make a lenticular convex lens according to my invention (Figure 4), the body portion 1 of the lens is prepared in the manner previously described in connection with Figure 1; multiple fields or concavities 20, 21 and 22 are surfaced in the body portion 1, these being of appropriate surface curvature to provide the requisite focal power, according to computations well known to those skilled in the art. These concavities 20, 21 and 22 are of the same curvatures, hence, have straight lines of joinder therebetween, as shown by the dotted lines in Figure 4. After the concavities 20, 21 and 22 have been prepared, a glass button 23 of a higher index of refraction is then fused into this series of concavities. When the surface 24 is ground over the entire lenticular side of the lens, the latter will be provided with portions 20, 21 and 22 having much higher focal powers than the border part of the body portion 1, due to the difference in power between the low-index lenses which, in effect, are ground out of the body portion 1 and replaced by the high-index lenses fused into the body portion. The outer surface 25 is then ground to the proper curvature to give the necessary visual power as well as the appropriate edge thickness. The fusing operation need not be delayed until all three depressions are made.

It will be observed from Figure 6 that if the lens had been made with a single lenticular depression, such as indicated by the dotted line 26, and provided with the outer surface 27 corresponding thereto, the total center thickness of the lens for the same diameter would be consequently greater and have a more bulging effect than occurs with my invention. The dotted lines in Figure 6 indicate the extra thickness required by this single lenticular portion of the prior art.

To provide a lenticular concave lens with a bifocal portion, we may proceed in two different ways. In Figure 7 we show such a bifocal lens employing the fused bifocal principle, wherein glass of a different index of refraction is employed to provide the area of different power for near vision. In Figure 9, however, we show a bifocal lens of the "solid" or "one-piece" type, this consisting of glass of the same index of refraction throughout. The one-piece bifocal of Figure 9 depends for its action upon the provision of a different surface curvature for the near-vision portion from that of the distant-vision portions of the lens. To provide a lenticular convex lens, as shown in Figure 11, we utilize the principle of employing different surface curvatures in the concavities, and then fill in the concavities with a glass of a higher index of refraction.

The lenticular concave fused bifocal shown in Figure 7 is preferably made by providing the body portion 30 with a deep countersink curve or concavity 31, this being of such curvature, as computed according to principles well-known to those skilled in the art, as to be suitable for reading vision in the completed lens. A glass button 32 of a higher index of refraction is then prepared and fused in this countersink 31. In the succeeding operations, the lens is completed by surfacing the multiple concavities 33, 34 and 35 of like curvatures in the lens in much the same manner as the concavities 4, 5 and 6 (Figure 1), previously described. The central concavity 33, however, and possibly the side concavities 34 and 35, intersect the portion of the lens occupied by the button 32 in such a manner as to extend thereover (Figure 8). Accordingly, when the border surface 36 and the outer surface 37 have been made, the resulting lens (Figure 7) will be provided with distant-vision portions 33, 34 and 35, together with a near vision portion 38 for reading or other near vision.

The button 32 can, if desired, be of the composite type in which the top part is made from glass of the same index as the major body portion. The top of the reading portion may then be made sensibly straight instead of steeply curved. This button insert may also be placed in the front surface of the lens.

The one-piece lenticular concave bifocal shown in Figure 9 is prepared, during its earlier stages of manufacture, in much the similar manner as the single vision lenticular concave lens shown in Figure 1. According to this procedure the body portion 40 is provided with concavities 41, 42 and 43 of like curvatures suitable for the distant vision requirements of the myopic wearer. Following this, the lens is provided with an additional concavity 44 adjacent to the concavities 41, 42 and 43, but of a different surface curvature. The surface curvature of the portion 44 is shallower or flatter than the surface curvature of the portions 41, 42 and 43, so that a more positive focal power is provided for the portion 44 in order to adapt it to near vision requirements. It will be observed that the dividing lines 45 and 46 between the portions of the same surface curvature are straight lines for the reasons previously given, whereas the dividing lines 47, 48 and 49 between these portions and the near-vision portion 44 are curved lines, due to the different surface curvature of the latter. The lens is then provided with a border surface 50 and an outer surface 51 in the manner previously described.

Thus is provided a bifocal lens having a plurality of distant-vision portions intersecting one another on straight lines, and a near-vision portion intersecting these on curved lines. All of these portions have independently-located optical centers.

In its early stages, the lenticular convex bifocal lens shown in Figures 11 and 12 is made in a manner somewhat similar to that of the one-piece bifocal shown in Figure 9. A body portion 60 is provided with suitable concavities 61, 62 and 63, whose curvatures are based upon the same principles and computations discussed in connection with Figure 4. These concavities are of the same surface curvatures and consequently intersect on the straight lines 64 and 65. A concavity 66 of deeper or stronger surface curvature is then ground in such a manner as to intersect the concavities 61, 62 and 63, the intersections being along the curved lines 67, 68 and 69. A glass button 70 of a higher index of refraction is then prepared and fused into the series of concavities previously described, and the exposed common surface 71 ground with a curvature suitable for the border portion 72, after which the opposite side 73 may be surfaced in accordance with the same principles discussed in connection with Figures 4 to 6. Thus the lenticular convex bifocal of Figures 11 and 12 consists of a plurality of portions adapted for distant vision, together with a portion suitable for near vision, each of these portions having its own optical center. Consequently, the hyperopic or aphakic wearer of this lens will be provided with distant and near vision portions suited to his own requirements.

Accordingly, we have provided a lenticular ophthalmic lens with multiple portions for distant vision, thereby providing a wide horizontal field of view with a moderate thickness of lens. Our lens will, therefore, be especially suitable for the visual requirements of persons requiring strong concave or convex lenses. Such lenses are called for in extremes of myopia and hyperopia, as well as in post-cataract or aphakic cases. It will be obvious that, while these multiple fields have independent optical centers, these centers are not necessarily located upon the same line. The number of fields is not necessarily limited to three, but can be increased to five or more, as is most suitable in view of the particular requirements of the wearer.

It will be understood that we desire to comprehend within our invention such modifications as may be necessary to adapt it to varying conditions and uses.

Having thus fully described our invention, what we claim as new and desire to secure by Letters Patent is:

1. A lenticular ophthalmic lens comprising a body portion having a non-visual border portion, and a plurality of visual portions of substantially the same focal power, said visual portions comprising a central field and lateral fields abutting said central field on the opposite sides thereof.

2. A lenticular ophthalmic lens comprising a body portion having a non-visual border portion, and a plurality of abutting visual portions of substantially the same focal power and arranged adjacent to one another.

3. A lenticular ophthalmic lens comprising a body portion having a non-visual border portion, and a plurality of abutting visual portions of substantially the same focal power and arranged horizontally adjacent to one another.

4. A lenticular ophthalmic lens comprising a body portion having a non-visual border portion, and a plurality of abutting visual portions of substantially the same focal power and arranged adjacent to one another in abutting relationship.

5. A lenticular ophthalmic lens comprising a body portion having a non-visual border portion and a plurality of intersecting concavities of substantially the same surface curvatures, and an inserted portion of a higher index of refraction secured in said concavities.

6. A lenticular ophthalmic lens comprising a body portion having a non-visual border portion, and a plurality of intersecting concavities, one of said concavities being of a different surface curvature, the remaining concavities being of the same surface curvature whereby to provide a lenticular lens having a multiple distant-vision portion and a single near-vision portion.

7. A lenticular ophthalmic lens comprising a body portion having a non-visual border portion and a plurality of intersecting concavities, one of said concavities being of a different surface curvature, the remaining concavities being of the same surface curvature, and an inserted portion of a higher index of refraction secured in said concavities.

8. A lenticular ophthalmic lens comprising a body portion having a non-visual body portion, a plurality of abutting distant-vision portions, and a near-vision portion associated therewith.

9. A lenticular ophthalmic lens comprising a body portion having a non-visual border portion, and a plurality of distant vision portions arranged to abut one another on straight lines, said distant-vision portions being arranged adjacent to one another in a horizontal direction.

EDWARD CULVER.
ALFRED HENRY EMERSON.